United States Patent [19]
Ferguson et al.

[11] Patent Number: 5,732,080
[45] Date of Patent: Mar. 24, 1998

[54] METHOD AND APPARATUS FOR CONTROLLING DATA FLOW WITHIN A SWITCHING DEVICE

[75] Inventors: H. Earl Ferguson, Los Altos; Jeffrey Prince, Sunnyvale; Mike K. Noll, San Jose; Randy Ryals, Menlo Park; Derek H. Pitcher, Newark, all of Calif.

[73] Assignee: Bay Networks, Inc., Santa Clara, Calif.

[21] Appl. No.: 501,483

[22] Filed: Jul. 12, 1995

[51] Int. Cl.$^6$ .............................. H04L 12/28; H04L 12/56
[52] U.S. Cl. .................... 370/392; 370/235; 370/389; 370/395
[58] Field of Search .................................. 370/395, 389, 370/473, 357, 386, 392, 419, 359, 235, 355, 257, 397, 352

[56] References Cited

U.S. PATENT DOCUMENTS

| | | | |
|---|---|---|---|
| 4,975,695 | 12/1990 | Almond et al. | 370/352 |
| 5,386,413 | 1/1995 | McAuley et al. | 370/392 |
| 5,524,113 | 6/1996 | Gaddis | 370/395 |

*Primary Examiner*—Wellington Chin
*Assistant Examiner*—Melissa Kay Carman
*Attorney, Agent, or Firm*—Blakely, Sokoloff, Taylor & Zafman LLP

[57] ABSTRACT

A method and apparatus for controlling data flow within a switching device are provided. The switching device includes a cell-switched backplane. Both packet switched and cell switched network interface cards may be coupled to the cell-switched backplane. A destination tag is created for each unique destination port and for each unique set of destination ports. The destination tags are used to index a master destination tag table. The entry of the master destination tag table that corresponds to a given destination tag includes a destination mask that indicates which ports are destination ports the given destination tag. Local tables are built and maintained within each network interface card based on the information contained in the master destination tag table. When a network interface receives data from an external device, the network interface determines the destination tag associated with the data. Once the destination tag is determined, it is used as an index to the locally stored tables to determine whether the data should be forwarded to any local ports, and whether the data should be sent over the cell-switched backplane to other network interfaces within the switching device. When a network interface receives data over the backplane, the network interface uses the destination tag as an index to a locally stored table to determine to which local ports the data should be sent. Tables also establish correlations between destination tags and control information for converting data between packets and cells.

33 Claims, 2 Drawing Sheets

METHOD AND APPARATUS FOR CONTROLLING DATA FLOW WITHIN A SWITCHING DEVICE

FIELD OF THE INVENTION

The present invention relates to controlling data flow within a switch, and more specifically, to a method and apparatus for controlling data flow between multiple network interfaces over a common backplane.

BACKGROUND OF THE INVENTION

Many types of computer networks have been developed, including token ring, Ethernet, asynchronous transfer mode (ATM) and FDDI networks. In general, the way each type of network encapsulates and communicates data is incompatible with the other types of networks. To allow communication between devices on otherwise incompatible networks, mechanisms have been developed which convert data from one form of data encapsulation to other forms.

Such conversion mechanisms may be used by switching devices to allow interface cards for different types of networks to communicate with each other over a common backplane. Multiple types of data transfers may take place between interface cards when multiple types of network interface cards are present in the same switching device. For example, if multiple token ring, Ethernet and ATM cards are present in the same system, numerous types of data transfers may occur between the interfaces (e.g. token ring to token ring, token ring to Ethernet, Ethernet to token ring, etc.)

Typically, switching devices that allow communication between various types of network interfaces provide numerous mechanisms for internally forwarding data between the interfaces. The forwarding mechanism used for a particular transfer depends on the source and destination of the data to be transferred. For example, one mechanism may be used to transfer packets between Ethernet interfaces, a second mechanism may be used to transfer cells between ATM interfaces, and a third mechanism may be used to transfer data from packets on an Ethernet interface to cells on an ATM interface.

The use of numerous forwarding mechanisms within a single switching device is complicated and, under many circumstances, inefficient. For example, two forwarding mechanisms may be required to transmit the same data from one token ring card to a port on another token ring card and to a port on an ATM card. Further, each of the forwarding mechanisms may require that the data be encapsulated in a different manner. Consequently, multiple conversion operations may be required, and multiple copies of the data may have to be routed though the switching device.

In light of the foregoing, it is clearly desirable to provide a mechanism that allows devices on different types of networks to communicate with each other. It is further desirable to provide a single mechanism for routing cells between interfaces within a switching device, regardless of the types of interfaces involved. It is further desirable to provide a forwarding mechanism that may be used for both transfers between ports on the same interface card, and between interface cards on the same switching device.

SUMMARY OF THE INVENTION

A method and apparatus for controlling data flow within a switching device are provided. The switching device includes a cell-switched backplane. Both packet switched and cell switched network interface cards may be coupled to the cell-switched backplane. A destination tag is created for each unique destination port and for each unique set of destination ports. The destination tags are used to index a master destination tag table. The entry of the master destination tag table that corresponds to a given destination tag includes a destination mask that indicates which ports are destination ports of the given destination tag.

Local tables are built and maintained within each network interface card based on the information contained in the master destination tag table. Specifically, each network interface card includes a table that indicates which local ports are destination ports for destination tags, and a table that indicates which other interfaces have destination ports for destination tags.

When a network interface receives data from an external device, the network interface determines the destination tag associated with the data. Once the destination tag is determined, it is used as an index to the locally stored tables to determine whether the data should be forwarded to any local ports, and whether the data should be sent over the cell-switched backplane to other network interfaces within the switching device. When a network interface receives data over the backplane, the network interface uses the destination tag as an index to a locally stored table to determine to which local ports the data should be sent. Tables also establish correlations between destination tags and control information for convening data between packets and cells.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
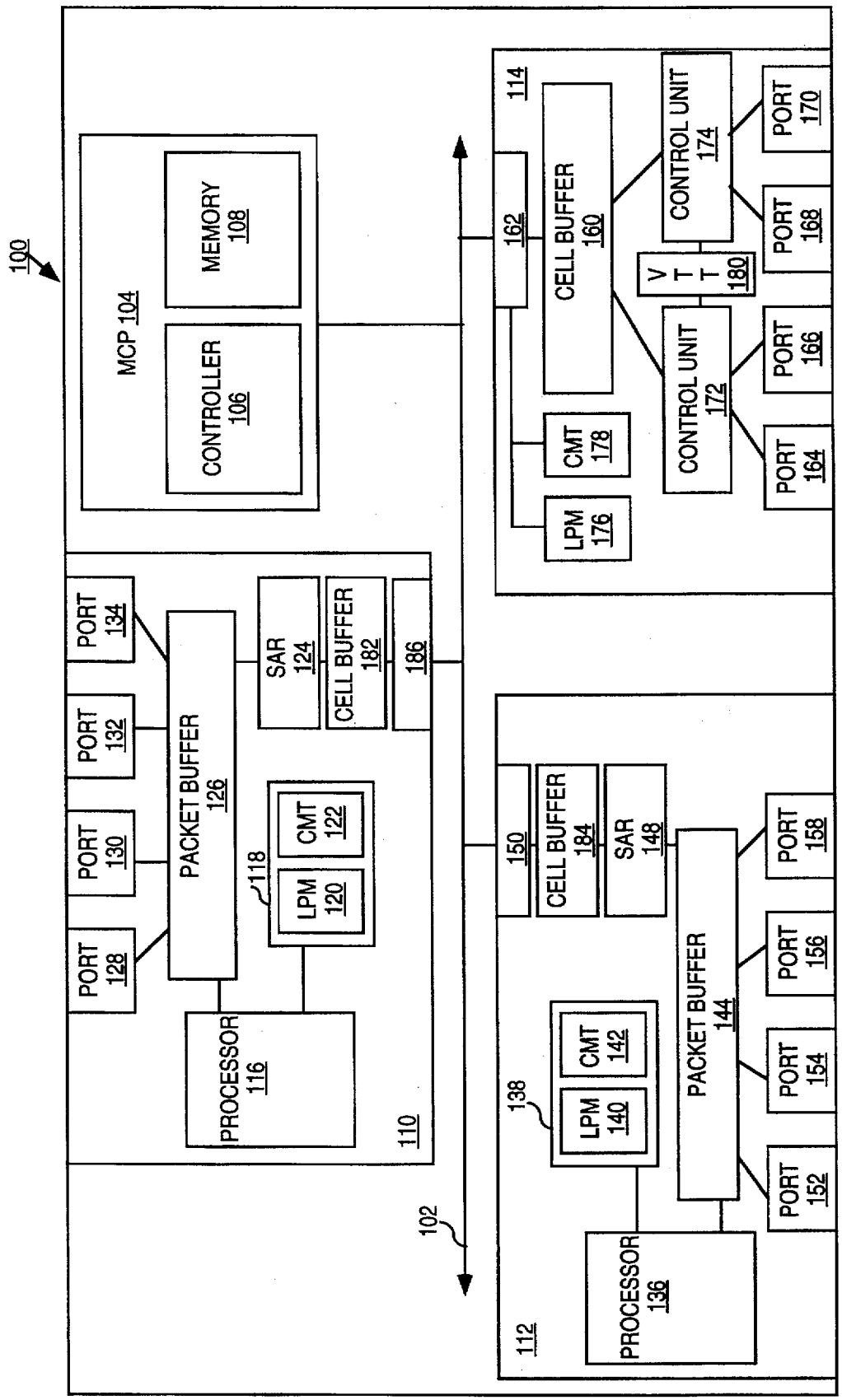
FIG. 1 illustrates a switching device according to an embodiment of the invention.

Referring to FIG. 1, it illustrates a switching device 100 according to one embodiment of the invention. Switching device 100 includes a common backplane 102 to which multiple switching interface cards may be connected. In the preferred embodiment, the common backplane 102 is an ATM cell switching backplane. However, the switching interface cards do not themselves have to be ATM interface cards. Any type of network interface card may used as long as circuitry is provided for converting data from the format supported by the interface cards to the format supported by the common backplane 102. Further, any number and combination of interface cards may be present, including token ring, ATM, FDDI and serial WAN interface cards. In the illustrated embodiment, two token ring interface cards 110 and 112 and one ATM interface card 114 are connected to the common backplane 102 in switching device 100.

Because backplane 102 is an ATM backplane, all data moving over the backplane 102 is in the form of ATM cells. All packet data received by non-ATM interface cards, such as token ring interface cards 110 and 112, must be segmented into cells when entering the backplane 102 and re-assembled into packets when leaving the backplane 102 for packet transmission.

Consequently, token ring interface cards 110 and 112 include circuitry for performing segmentation and reassembly. Specifically, cards 110 and 112 respectively include packet buffers 126 and 144 connected to their respective ports. Both incoming and outgoing packets are temporarily stored these packet buffers.

If a packet received from an external source is to be transmitted to one or more ports on one or more other interface cards, then a Segmentation And Reassembly circuit (SAR) encapsulates the data from the packet into ATM cells, which are then stored in a cell buffer. Similarly, data received from other cards is encapsulated in ATM cells. Packet-based cards, such as token ring interface cards 110 and 112 must extract the appropriate information from the cells, which are stored in the cell buffer, and encapsulate the data in a packet constructed in the packet buffer.

Cards 110 and 112 respectively include SARs 124 and 148 which are respectively connected between packet buffers 126 and 144 and cell buffers 182 and 184. Cell buffers 182 and 184 are respectively coupled to backplane 102 through backplane interfaces 186 and 150. In the illustrated embodiment, processing is performed on cards 110 and 112 by processors 116 and 136 respectively. Processors 116 and 136 are respectively coupled to memory 118 and 138.

According to one embodiment, communications between backplane 102 and cards 110 and 112 are performed as disclosed in U.S. patent application Ser. No. 08/501,537, entitled "A LAN/ATM SWITCH HAVING LOCAL PACKET SWITCHING AND AN ATM CORE FABRIC" filed on Jul. 12, 1995, abandoned, and U.S. patent application Ser. No. 08/501,454, entitled "METHOD AND APPARATUS FOR TRANSMITTING CELLS ACROSS AN ATM SWITCH BUS", filed on Jul. 12, 1995, abandoned, the contents of which are incorporated herein by reference.

The data received by ATM card 114 from external sources is encapsulated in the form of ATM cells. Consequently, ATM card 114 does not need to perform packet-to-cell conversions prior to sending data over ATM backplane 102 to other cards within device 100. ATM card 114 includes control units 172 and 174 coupled between its ports and a cell buffer 160. A VTT 180 is coupled between control unit 172 and control unit 174. The cell buffer 160 is coupled to the ATM backplane 102 through an interface 162.

Switching device 100 includes a master control process (MCP) 104 for controlling the flow of information within switching device 100. The data transfers that occur between interface cards within switching device 100 included three general types of traffic. Data that is sent between packet switching interfaces (e.g. data sent from token ring interface card 110 to token ring interface card 112) is referred to as LAN-to-LAN traffic. Data that is sent between a packet switching interface and a cell switching interface (e.g. data sent from token ring interface card 110 and ATM interface card 114) is referred to as LAN-to/from-ATM traffic. Data that is sent between two cell switching interfaces is referred to as ATM-to-ATM traffic.

MCP 104 includes a controller 106 and a memory 108. Memory 108 stores a plurality of tables, including a master destination tag ("Dtag") table that shall be described hereafter. Controller 106 generally represents control circuitry used to construct and maintain the tables within memory 108, and to control the flow of data within device 100 based on those tables. Controller 106 may be implemented with hard wired circuitry, or by causing a processor to execute instructions. The present invention is not limited to a particular implementation of controller 106. Further, MCP 104 is illustrated separate from cards 110, 112 and 114 for the purposes of explanation. However, MCP 104 may actually reside on one of the interface cards, or be distributed among the various interface cards.

DESTINATION TAGS

MCP 104 uses Dtags to control the distribution of data within and between each of the cards in device 100, and between ports on each of the cards. Data flow management primarily involves the routing of cells over the backplane 102 and between ports, and the control of segmentation and re-assembly of packets to and from cells. Controls are provided for the stripping and adding of appropriate encapsulation headers during both segmentation and re-assembly to provide standardized formatting of packet data over cell based networks.

In the preferred embodiment, Dtags are twelve bit values. By convention, the four high order bits for Dtags used for point-to-point forwarding are zero. The second four bits in a point-to-point Dtag specify the destination card and the low order four bits specify the destination port on the specified destination card. The Dtags for point-to-point forwarding are pre-allocated upon the initialization of switch device 100. This convention is arbitrary. In some embodiments it may simplify recognition of the direct single port Dtags.

For operations in which data is sent to multiple ports (multi-cast operations), at least one of the first four bits is non-zero. These multi-cast Dtags and their associated table entries are allocated after initialization as needed to represent the virtual architecture of the switching device 100. In the preferred embodiment, special Dtags are also allocated for transmitting messages to MCP 104.

Figure 2:
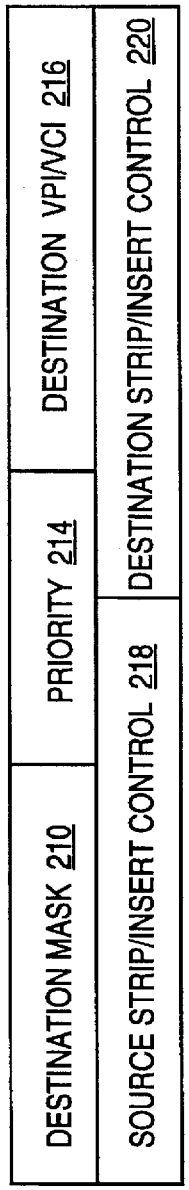
FIG. 2 illustrates an entry in a master destination tag table according to an embodiment of the invention.

A Dtag is used as an index to tables that provide the necessary information to allow the various components within the switch device 100 to deal with the forwarding and management of packet/cell data flows. As mentioned above, MCP 104 maintains a master Dtag table within the memory 108. According to one embodiment, each entry within the master Dtag table has the form illustrated by entry 200 in FIG. 2. Specifically, each Dtag entry includes a destination mask 210, a priority value 214, a destination VPI/VCI value 216, a source strip/insert control field 218, and a destination strip/insert control field 220.

Each port on each card within device 100 is represented by one bit within destination mask 210. The bit that corresponds to a port is set if the port is a destination port for data associated with the Dtag entry. In the preferred embodiment, all ports on a given interface card correspond to contiguous bits within the destination mask 210. Consequently, it may be quickly determined whether data associated with a particular Dtag entry should be sent to a particular card by performing an OR operation on the bits within destination mask 210 that correspond to the ports on the card.

Priority value 214 indicates the priority level to be used when transmitting data to the destination ports designated in the Dtag entry. The destination VPI/VCI value 216 is used for ATM cells that are sourced on an ATM card or sent from an ATM card. Since the destination for a packet received by a LAN card may be an ATM port on an ATM card, them must be a place to carry the destination VPI/VCI value. The destination VPI/VCI value 216 stores the information necessary for this case.

As mentioned above, packets must be converted to cells when data received by a LAN card is sent to any other card over ATM backplane 102. The source strip/insert control field 218 includes control data used to construct the appropriate cell headers during the segmentation process. When a LAN card receives cells over ATM backplane 102 from another card, the LAN card must reassemble that data contained in the cells into a packet. The destination strip/insert control information 220 includes control data used to construct the appropriate packet headers during the reassembly process.

ROUTING WITHIN DEVICE 100

Controller 106 creates a unique Dtag entry in the master Dtag table contained in memory 108 for each destination or combination of destinations. Each entry in Dtag table has a unique index. The indexes to the entries in the master Dtag table are referred to as Dtags. These same Dtags are also used to index other tables that shall be described hereafter. As shall be explained hereafter, Dtags and the tables indexed thereby are the primary mechanisms for routing data within device 100.

In the illustrated example, token ring card 110 includes four ports 128, 130, 132 and 134, token ring card 112 includes four ports 152, 154, 156 and 158, and ATM card 114 includes four ports 164, 166, 168 and 170. Data received by any of the interface cards within device 100 may be destined for any one of the ports on any one of the interface cards. Consequently, the master Dtag table preferably contains one entry for each of the ports on each of the interface cards. The destination mask 210 in the Dtag entry that corresponds to a given port would have the bit that corresponds to the port set.

In addition to switching from and to a single port, data received at one port may be destined for more than one other port. For example, packets may arrive at port 128 that are to be transmitted out through ports 130, 152 and 154. To support such one-to-many transfers, a Dtag entry is constructed for each desired unique set of destination ports. Typically, Dtag entries are not constructed for every possible unique set of destination ports, since the number of possible combinations may be extremely high. Rather, Dtag entries are constructed for every unique set of destination ports for which there is a mason to send data to the ports as a set (e.g. the set of ports that belong to a virtual token ring). To support the transfer described in the above example, a Dtag entry would be constructed in which the bits of the destination mask 210 that correspond to ports 130, 152 and 154 would be set.

DESTINATION DESIGNATIONS

When data is received by an interface card within device 100, the data will contain some indication as to where the data is to be sent. The type of destination information will vary based on the type of message that contains the data and type of network from which the data was received. For example, a packet received at port 128 of token ring interface card 110 may designate a destination with a MAC address. In contrast, cells received at port 164 may designate a destination with a VCI value.

Rather than attempt to route information between interface cards by directly using these various incompatible types of destination designations, the present invention uses the destination designations to determine the appropriate Dtag for a particular block of data, and routes all data within device 100 based on the Dtag.

To determine the Dtag appropriate for a particular block of data, controller 106 constructs and maintains tables within memory 108 in addition to the master Dtag table. In the preferred embodiment, the tables used to determine the Dtag appropriate for incoming data include a VCI-to-Dtag table that establishes a correspondence between VCI values and Dtags, a LTR-to-Dtag table that establishes a correspondence between virtual token rings and Dtags, and a GA-to-Dtag table that establishes a correspondence between group addresses and Dtags.

It should be noted that the tables described herein may contain fields in addition to those mentioned. For example, each entry in the VCI-to-Dtag table may include a reassembly ID value and a quality of service value. The LTR-to-Dtag table may include a ring number. The present invention is not limited to any particular set of tables or fields.

CENTRALIZED ROUTING

According to one embodiment, controller 106 controls all routing within device 100 based on the tables described above. In such an embodiment, when an interface card receives data, the interface card transmits the destination designation for the data over backplane 102 to controller 106. Controller 106 uses the destination designation as in index to a table to determine the appropriate Dtag for received data. For example, if the destination designation indicated a particular VCI value, then the VCI value would be used as an index to the VCI-to-Dtag table to determine the appropriate Dtag.

Once the appropriate Dtag is determined, the Dtag is used as an index to the master Dtag table to determine the appropriate Dtag entry. The data contained in the Dtag entry is used to determine the cards and ports to which the data must be sent over backplane 102. Cells containing data that indicates the cards and ports to which the data must be sent is communicated over backplane 102 to the interface card which received the data. The interface card then begins transferring the data to the appropriate interface cards over backplane 102.

In an embodiment where all of the Dtag information is only contained in a central location such as the embodiment described above, much of the bandwidth of backplane 102 is used simply for communications between MCP 104 and the various interface cards. To avoid such inefficient use of the backplane 102, the preferred embodiment distributes the information contained in the tables stored in memory 108 to the various interface cards.

DECENTRALIZED TABLES

According to the preferred embodiment, controller 106 transmits information over backplane 102 to the various interface cards to cause the cards to build their own internal tables. The tables contained in each card include tables for determining the Dtags for all data that the card may receive from external sources, and tables indexed by the Dtags for determining the cards and ports to which the data must be sent.

The tables used to determine the Dtags for data received from outside sources may include locally stored versions of the VCI-to-Dtag table, LTR-to-Dtag table and/or GA-to-Dtag table described above. Tables indexed by the Dtags for determining the cards and ports to which the data must be sent may include a locally stored version of all or a portion of the master Dtag table. However, in the preferred embodiment, information from the master Dtag table is used to create two locally stored tables. This embodiment is illustrated in FIG. 1.

Specifically, cards 110, 112 and 114 respectively include Local Port Mask tables (LPMs) 120, 140 and 176 and Card Mask Tables (CMTs) 122, 142, and 178. LPMs 120, 140 and 176 are tables, indexed by Dtags, which indicate which of the local ports on the card are destination ports for a given Dtag. For example, assume that the Dtag "DTAG1" is the index for an entry in the master Dtag table whose destination mask 210 designates ports 128, 152 and 154 as destination ports. LPM 120 would have a corresponding entry, indexed by DTAG1, that designates that port 128 is a destination port.

CMTs 122, 142 and 178 are tables, indexed by Dtags, which indicate which of the other interface cards within device 100 should be sent data that is associated with a given Dtag. Using the DTAG1 example given above, CMT 122 would have an entry, indexed by DTAG1, that designates interface card 112 as a destination card. Interface card 112 is a destination card for data associated with DTAG1 because ports 152 and 154, which are destination ports for DTAG1, reside on interface card 112.

Continuing with the DTAG1 example, LPM 140 in interface card 112 would contain an entry, indexed by DTAG1, which designates ports 152 and 154 as destination ports. CMT 142 in interface card 112 would contain an entry, indexed by DTAG1, which designates interface card 110 as card to which data associated with DTAG1 must be sent. In ATM interface card 114, the entry in LPM 176 indexed by DTAG1 would not designate any local ports as destination ports. The entry in CMT 178 indexed by DTAG1 would designate both interface cards 110 and 112 as cards to which data associated with DTAG1 must be sent.

A LPM entry for a given Dtag may be easily constructed from the Dtag entry in the master Dtag table for the Dtag. Specifically, for each interface card, the LPM entry for a Dtag includes those bits within the destination mask 210 field that correspond to the ports on the interface card.

Figure 3:
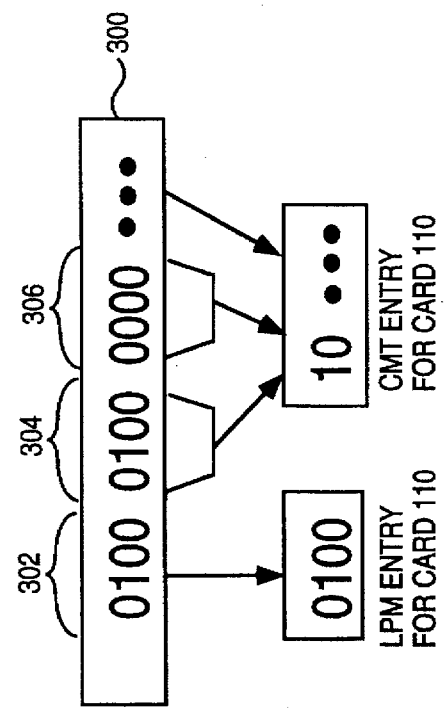
FIG. 3 illustrates how information for constructing locally stored tables is derived from the destination mask field in the master destination tag table.

Referring to FIG. 3, the destination mask 300 of an exemplary Dtag entry is illustrated. The bits in destination mask 300 correspond to ports 128, 130, 132, 134, 152, 154, 156, 158, 164, 166, 168 and 170 respectively. Of these bits, the bits indicated by 302 correspond to the ports on card 110. Consequently, for card 110, the LPM entry for the Dtag in question includes the bits indicated by 302.

A CMT entry for a given Dtag may also be easily constructed from the entry in the master Dtag table that corresponds to the Dtag. Specifically, each CMT entry includes one bit for each interface card within device 100 other than the interface card on which the particular CMT is stored. The bit that corresponds to a given interface card is set if any one of the bits in the destination mask 210 that correspond to the ports on the given interface is set.

Referring again to FIG. 3, the bits indicated by 304 correspond to ports on card 112, and the bits indicated by 306 correspond to ports on card 114. The CMT entry in card 110 for the Dtag in question includes one bit for each card other than card 110 that is present in device 100. The bit that corresponds to a card is set in the CMT entry if any bits that correspond to the ports on the card are set in the destination mask. In the illustrated example, at least one of the bits 304 that correspond to ports on card 112 is set, so the bit corresponding to card 112 in the CMT entry is set. None of the bits 306 that correspond to ports on card 114 are set, so the bit corresponding to card 114 in the CMT entry is not set.

DECENTRALIZED ROUTING

The tables described above are stored locally on the various interface cards so that intra-card and inter-card routing control functions may be performed locally within the cards rather than through the intervention of the MCP 104. Specifically, when any interface card within device 100 receives data from an external source, the destination address of the data (IEEE MAC address for token ring interface cards, VPI/VCI for ATM cards) is used to determine the appropriate Dtag for the data. As mentioned above, the correspondence between the various types of destination addresses and Dtags are stored in tables maintained locally within each interface card. Consequently, the Dtag for a particular block of received data may be determined by the receiving interface card without any additional communication with MCP 104.

Once the Dtag for the received block of data has been determined, the interface card determines where the data must be sent. Specifically, circuitry on the interface card, such as processor 116, uses the Dtag as an index to the locally stored LPM to determine whether the data is to be sent out on a local port, and as an index to the locally stored CMT to determine whether the data is to be sent over backplane 102 to one or more other interface cards.

If the LPM entry corresponding to the Dtag indicates that the received data is to be sent out on one or more local ports (other than the port on which the data arrived), the interface card sends the data to the specified local ports. If the CMT entry corresponding to the Dtag indicates that the data is sent to one or more other cards in device 100, then the data is placed on backplane 102. In the preferred embodiment, the card mask from the CMT entry is placed on the backplane 102 prior to placing the data on the backplane. Each card in device 100 reads the card mask to determine whether it should read the subsequent data.

If the data was received by a LAN card, then the data must be packaged into cells prior to placing the data on backplane 102. This process typically requires stripping some information from the packets and adding additional information to encapsulate the data into ATM cells. This operation is performed by the SAR unit within the LAN card based on control information stored in one or more locally maintained tables. The entries for such tables are constructed based on the source strip/insert control field 218 in the master Dtag table.

If the data was received by an ATM card, then the data is already in the cell format. However, control information must still be placed in the cells to designate the Dtag associated with the cells prior to placing the cells onto the backplane 102.

In the preferred embodiment, the operation of sending out on one or more ports of a LAN card a packet that arrived on a port of the same LAN card is performed without converting the packet to ATM cells. Consequently, packets that are only between ports on the same LAN card do not have to be segmented, re-assembled, or transferred over backplane 102. This significantly reduces the traffic over backplane 102 while increasing the efficiency of local port-to-port packet transfers.

Cells containing data that is to be transferred from the receiving interface card to one or more other interface cards is placed on the backplane 102 by the interface card that received the data from an external source. As mentioned above, the header for the cells contains data indicating the Dtag associated with the cells. Each interface card inspects the card mask placed on the backplane to determine whether the interface card is a destination interface card for the cell that will follow the card mask. Each card indicated as a destination card by the card mask reads the cell off of backplane 102 and stores the cell in a cell buffer.

For each cell read by an interface card off backplane 102, the Dtag associated with a cell is determined by the cell header information. Once the Dtag has been determined, the Dtag is used as an index to the local LPM table to determine on which local ports the data is to be sent. Once the local ports have been determined, the data is sent to external devices through the specified local ports.

For ATM cards, the data to be sent out on local ports may be sent as cells, so no conversion is necessary. However, for LAN cards, the data from the cells must be m-assembled into packets. The re-assembly process typically includes stripping some information from the cells, and adding information to create a packet. The information to strip and/or add for any given re-assembly operation is determined with reference to one or more locally stored tables. Such tables include the information from the destination strip/insert control 220 field of the master Dtag table. Once the packets have been re-assembled, they are sent out through the designated ports.

VIRTUAL TOKEN RING FORWARDING

As explained above, all intra-card as well as inter-card transfers are performed based on Dtags. The use of a single forwarding mechanism creates advantages not available in systems in which multiple forwarding mechanisms are used. For example, using Dtags, virtual token rings may be established in a simple, straightforward and efficient manner.

Token rings are a well known network architecture in which each device on the "ring" is sequentially given the opportunity to place messages on a shared medium. A virtual token ring functions in the same manner, but not all of the devices are on the same shared medium. Rather, some of the devices are connected to a medium coupled to one port of a switch, and other devices are connected to at least one other medium coupled to another port on the switch. The ports may or may not reside on the same network interface card. Even though the devices are not all connected to the same shared medium, the devices may communicate as if they were connected to a shared medium if all messages applied to each medium are forwarded to the one or more other mediums.

The use of Dtags allows device 100 to easily implement virtual token rings by establishing a Dtag for each virtual token ring. For example, assume that a user wishes to establish a virtual token ring that includes all of the devices connected to ports 130, 154 and 156. Controller 106 would create an entry in the master Dtag table in which the destination mask 210 had the bits associated with ports 130, 154 and 156 set. Assume that the Dtag for this entry is DTAG2.

MCP 104 would then transmit messages to cards 110 and 112 to establish LPM and CMT entries for DTAG2. The entry for DTAG2 in LPM 120 would have the bit associated with port 130 set. The entry for DTAG2 in CMT 122 would have the bit associated with card 112 set. The entry for DTAG2 in LPM 140 would have the bits associated with ports 154 and 156 set. The entry for DTAG2 in CMT 142 would have the bit associated with card 110 set.

In addition, MCP 104 would transmit messages to cards 110 and 112 to establish a correlation between DTAG2 and the destination designations that will be contained in packets received on ports 130, 154 and 156. For example, cards 110 and 112 may each contain a table mapping the MAC addresses of every device in the virtual network to a virtual network number, and a LTR-to-Dtag table mapping the virtual network number to DTAG2.

Once the entries for the local tables have been established as described above, the operation of the virtual token ring is virtually automatic. Specifically, all packets received on port 130 would contain destination designations that would be mapped by card 110 to DTAG2. Card 110 would use DTAG2 to index LPM 120 and CMT 122 to determine that the packets are to be forwarded to card 112 over backplane 102. Card 110 causes the packets to be segmented and placed on backplane 102 with header data indicating DTAG2 as the applicable DTAG.

Card 112 would receive the cells from backplane 102 and reassemble the packet. Card 112 would use DTAG2 as an index to LPM 140 to determine that the packet should be sent out on ports 154 and 156. Card 112 would then send the packets out through ports 154 and 156.

In the same manner, packets arriving on port 154 would be forwarded to ports 156 and 130, and packets arriving on port 156 would be forwarded to ports 154 and 130. As a consequence, packets on one medium in a virtual token ring will always appear on the other media in the virtual token ring, even though the various media are not actually directly connected.

MONITORING OPERATIONS

The use of Dtags greatly facilitates monitoring operations. For example, assume that a user wishes to monitor all of the data sent out through port 128. A user may perform this monitoring by connecting a monitoring device to another port (e.g. port 152), and modifying the tables contained within device 100 to cause all data designated for port 128 to also be forwarded to port 152.

Specifically, a user would send a message to MCP 104 requesting that all data forwarded to port 128 be forwarded to port 152. In response to the message, controller 106 scans the master Dtag table to find all entries which have destination masks that designate port 128 as a destination port. For each of these entries, controller 106 detects whether the destination mask also designates port 152 as a destination port. If port 152 is not designated as a destination port, then the bit in the destination mask that corresponds to port 152 is set to designate port 152 as a destination port.

Controller 106 also transmits messages over backplane 102 to cause all interface cards residing within device 100 to update their locally stored tables consistent with the changes made to the master Dtag table. Such messages, for example, would specify the Dtags of all entries to which port 152 was added as a destination port. Each card is preferably sent only the information necessary to update its own internally maintained tables. In response to these messages, cards 110 and 114 would update CMTs 122 and 178 respectively, to ensure that the entries associated with the specified Dtags identify card 112 as a destination card. Card 112 would respond to the messages by updating LPM 140 to ensure that the entries associated with the specified Dtags identify port 152 as a destination port.

Once the local tables have been updated in this manner, the Dtag-based forwarding mechanism described above will cause all data designated for port 128 to also be sent out port 152. These same basic steps may be used to implement any number of monitoring operations. For example, all data designated for all ports of a virtual token ring may be forwarded to a port used for monitoring. Data designated for all ports of a particular card may be forwarded to a port on another card for monitoring. In general, all data designated for any specified set of ports may be forwarded to any specified set of other ports, regardless of whether there is any relationship between any of the monitored or monitoring ports.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for forwarding data between ports on a plurality of network interfaces located in a switching device, the method comprising the steps of:

receiving data at a first port on a first network interface in said switching device;

determining a destination tag for said data based on destination information contained with said data;

using said destination tag as an index to a first table to determine whether any ports on said first network interface other than said first port are associated with said destination tag;

if one or more ports on said first network interface other than said first port are associated with said destination tag, then forwarding said data to said one or more ports;

using said destination tag as an index to a second table to determine whether any of said plurality of network interfaces other than said first network interface include ports that are associated with said destination tag;

if one or more network interfaces other than said first network interface include ports that are associated with said destination tag, then forwarding said data to said one or more network interfaces over a common backplane.

2. The method of claim 1 further comprising causing each of said one or more network interfaces to perform the following steps:

reading said data from said common backplane;

using said destination tag as an index to a third table to determine whether any ports on said network interface is associated with said destination tag; and if one or more ports on said network interface is associated with said destination tag, then forwarding said data to said one or more ports.

3. The method of claim 1 wherein:

said first network interface is a LAN interface and said common backplane is a cell switched backplane, said step of receiving data at said first port comprises receiving a packet at said first port;

said step of forwarding said data to said one or more network interfaces over a common backplane comprises placing one or more cells containing information from said packet onto said backplane;

the method further comprising the step of converting said packet into said one or more cells.

4. The method of claim 3 wherein the step of converting said packet into one or more cells includes using said destination tag as an index to a table to determine which information to strip from and add to said packet to create said one or more cells.

5. The method of claim 1 wherein said first table and said second table are stored on said first network interface.

6. The method of claim 5 wherein said first table is a different table than said second table.

7. The method of claim 1 further comprising the step of constructing said first table and said second table based on information contained in a master destination tag table.

8. The method of claim 7 wherein:

said master destination tag table includes a plurality of entries, each entry corresponding to a destination tag;

each entry of said master destination tag table includes a destination mask, said destination mask indicating which of all the ports on all of said plurality of network interfaces are destination ports for said corresponding destination tag.

9. The method of claim 1 wherein said step of forwarding said data to said one or more network interfaces over a common backplane includes:

encapsulating said data into cells;

adding said destination tag into a header on each of said cells; and applying said cells to said common backplane.

10. A switching device comprising:

a backplane; and a plurality of network interfaces coupled to said backplane;

each of said plurality of network interfaces comprising one or more ports;

a first set of correlation data that establish a correlation between destination information and destination tags;

a second set of correlation data that establish a correlation between destination tags and said one or more ports on said network interface;

a third set of correlation data that establish a correlation between destination tags and the other of said plurality of network interfaces; and a forwarding mechanism configured to forward data between and among said one or more ports and said backplane based on said first, second and third sets of correlation data.

11. The switching device of claim 10 wherein said forwarding mechanism is configured to forward data received at one of said one or more ports by:

reading destination information from said data;

inspecting said first set of correlation data to determine a destination tag for said data based on said destination information from said data;

inspecting said second set of correlation data to determine whether any of said one or more ports are associated with said destination tag;

forwarding said data to each of said one or more ports that are associated with said destination tag;

inspecting said third set of correlation data to determine whether any of said other network interfaces are associated with said destination tag; and placing said data on said backplane if any of said other network interfaces are associated with said destination tag.

12. The switching device of claim 10 wherein said forwarding mechanism is configured to forward data received over said backplane from another of said network interfaces by:

determining a destination tag for said data;

inspecting said second set of correlation data to determine whether any of said one or more ports are associated with said destination tag; and forwarding said data to each of said one or more ports that are associated with said destination tag.

13. The switching device of claim 11 wherein said forwarding mechanism is configured to add an indication of said destination tag to said data prior to placing said data on said backplane.

14. The switching device of claim 12 wherein said forwarding mechanism determines said destination tag for said data by extracting an indication of said destination tag from said data.

15. The switching device of claim 10 wherein said backplane is a cell switched backplane and at least one of said plurality of network interfaces is a packet switched interface for a packet switched network, said forwarding mechanism on said packet switched interface including a segmentation and reassembly unit for converting packets into cells prior to placing the cells on the backplane and for reassembling cells received from said backplane into packets.

16. The switching device of claim 15 wherein said packet switched interface includes a fourth set of correlation data that establish a correlation between destination tags and conversion information, said forwarding mechanism on said packet switched interface inspecting said fourth set of correlation data to determine how to convert a packet associated with a destination tag to cells, said forwarding mechanism on said packet switched interface inspecting said fourth set of correlation data to determine how to convert cells associated with a destination tag to a packet.

17. The switching device of claim 10 further comprising a master control process configured to maintain a master destination tag table, said master destination tag table establishing a correlation between destination tags and sets of ports, each set of said sets of ports including one or more ports located on one or more of said plurality of network interfaces.

18. The switching device of claim 17 wherein said master control process transmits messages containing information derived from said master destination tag table to each of said plurality of network interfaces, each of said plurality of network interfaces constructing said first, second and third sets of correlation data based on the information derived from said master destination tag table contained in said messages.

19. The switching device of claim 18 wherein the messages sent to any given network interface include a mapping between destination tags and one or more ports on said given network interface, and a mapping between destination tags and each of the other network interfaces present in the switching device.

20. The switching device of claim 10 configured to implement a virtual token ring that includes a particular set of ports by establishing a unique destination tag for said virtual token ring, wherein, for each of said plurality of network interfaces:

said second set of correlation data establishes a correlation between said unique destination tag and the ports on said network interface that belong to said particular set of ports; and said third set of correlation data establishes a correlation between said unique destination tag and the network interfaces, of said other of said plurality of network interfaces, that include at least one port of said particular set of ports.

21. The switching device of claim 10 configured to allow data that is sent out any port of a set of one or more ports to be monitored on a particular port of a particular network interface, wherein:

for each of said network interfaces other than said particular network interface, every entry in said third set of correlation data that corresponds to a destination tag of a particular set of destination tags establishes a correlation between said destination tag and said particular network interface;

for said particular network interface, every entry in said second set of correlation data that corresponds to a destination tag of said particular set of destination tags establishes a correlation between said destination tag and said particular port;

said particular set of destination tags including all destination tags that are correlated in second set of correlation data on any of said plurality of network interfaces with any port of said set of one or more ports to be monitored.

22. A method for forwarding data between ports on a plurality of network interfaces located in a switching device, the method comprising the steps of:

when data arrives at any port of any of said plurality of network interfaces performing the steps of determining a destination tag for said data based on destination information contained with said data by using the destination information as an index into a first table to retrieve a corresponding destination tag if the destination information represents a first type of destination designation scheme, and using the destination information as an index into a second table to retrieve a corresponding destination tag if the destination information represents a second type of destination designation scheme;

using said destination tag as an index to correlation data to determine a set of destination ports associated with said destination tag; and forwarding said data to each destination port in said set of destination ports.

23. The method of claim 22 wherein:

the data arrives at a first port, said first port residing on a first network interface;

the step of using said destination tag as an index to correlation data to determine said set of destination ports includes the steps of using said destination tag as an index to said correlation data to determine whether any ports on said first network interface other than said first port are associated with said destination tag; and using said destination tag as an index to said correlation data to determine whether any of said plurality of network interfaces other than said first network interface are associated with said destination tag.

24. The method of claim 23 wherein the step of forwarding said data to each destination port in said set of destination ports includes the steps of:

if one or more ports on said first network interface other than said first port are associated with said destination tag, then forwarding said data to said one or more ports;

if one or more network interfaces other than said first network interface are associated with said destination tag, then forwarding said data to said one or more network interfaces over a common backplane.

25. The method of claim 23 wherein said correlation data is stored locally on said first network interface and said steps of determining whether any ports on said first network interface other than said first port are associated with said destination tag and determining whether any of said plurality of network interfaces other than said first network interface are associated with said destination tag are performed by a forwarding mechanism located on said first network interface.

26. The method of claim 22 further comprising the step of establishing a virtual token ring that includes a first set of ports by performing the steps of:

creating a destination tag for said virtual token ring;

updating said correlation data to establish a correlation between said destination tag and each port in said first set of ports.

27. The method of claim 22 further comprising the step of monitoring at a given port data that flows through a first set of ports, said step of monitoring including the steps of:

inspecting said correlation data to determine a set of destination tags, said set of destination tags including all of the destination tags that are associated with any port in said first set of ports;

updating said correlation data to cause each destination tag in said set of destination tags to also be associated with said given port.

28. A switching device comprising:

a backplane; and a plurality of network interfaces coupled to said backplan;

each of said plurality of network interfaces comprising one or more ports,
- a first set of correlation data that maps destination addresses to destination tags,
- a second set of correlation data that maps destination tags from said first set of correlation data to said one or more ports on said network interface, and
- a forwarding mechanism configured to forward data among said one or more ports based on said first set of correlation data and said second set of correlation data.

29. The switching device of claim 28, further comprising a third set of correlation data that maps destination tags from said first set of correlation data to other of said plurality of network interfaces, and wherein the forwarding mechanism is configured to forward data between and among said one or more ports and said backplane with reference to said third set of correlation data.

30. The switching device of claim 28 wherein said forwarding mechanism is configured to forward data received over said backplane from another of said network interfaces by:

determining a destination tag for said data based upon said first set of correlation data;

accessing said second set of correlation data with said destination tag to determine whether any of said one or more ports are associated with said destination tag; and forwarding said data to each of said one or more ports that are determined to be associated with said destination tag.

31. A method for forwarding data between ports on a plurality of network interfaces located in a switching device, the method comprising the steps of:

when data arrives at a first port, said first port residing on a first network interface performing the steps of determining a destination tag for said data based on destination information contained with said data;

using said destination tag as an index to correlation data to determine a set of destination ports associated with said destination tag by determining whether any ports on said first network interface other than said first port are associated with said destination tag, and determining whether any of said plurality of network interfaces other than said first network interface are associated with said destination tag; and forwarding said data to each destination port in said set of destination ports.

32. The method of claim 31 wherein the step of forwarding said data to each destination port in said set of destination ports includes the steps of:

if one or more ports on said first network interface other than said first port are associated with said destination tag, then forwarding said data to said one more ports;

if one or more network interfaces other than said first network interface are associated with said destination tag, then forwarding said data to said one or more network interfaces over a common backplane.

33. The method of claim 31 wherein said correlation data is stored locally on said first network interface and said steps of determining whether any ports on said first network interface other than said first port are associated with said destination tag and determining whether any of said plurality of network interfaces other than said first network interface are associated with said destination tag are performed by a forwarding mechanism located on said first network interface.

* * * * *

(12) EX PARTE REEXAMINATION CERTIFICATE (6310th)
United States Patent
Ferguson et al.

(10) Number: US 5,732,080 C1
(45) Certificate Issued: Jul. 22, 2008

(54) METHOD AND APPARATUS FOR CONTROLLING DATA FLOW WITHIN A SWITCHING DEVICE

(75) Inventors: H. Earl Ferguson, Los Altos, CA (US);
Jeffrey Prince, Sunnyvale, CA (US);
Mike K. Noll, San Jose, CA (US);
Randy Ryals, Menlo Park, CA (US);
Derek H. Pitcher, Newark, CA (US)

(73) Assignee: Nortel Networks Limited, Brampton, Ontario (CA)

Reexamination Request:
No. 90/007,192, Sep. 2, 2004

Reexamination Certificate for:
Patent No.: 5,732,080
Issued: Mar. 24, 1998
Appl. No.: 08/501,483
Filed: Jul. 12, 1995

(51) Int. Cl.
*H04L 12/56* (2006.01)
*H04Q 11/04* (2006.01)

(52) U.S. Cl. .................. 370/392; 370/235; 370/389; 370/395.32; 370/395.71

(58) Field of Classification Search ................ 370/235, 370/389, 392, 395.3, 395.31, 357, 397, 355, 370/359, 257, 419, 473, 386
See application file for complete search history.

(56) References Cited

U.S. PATENT DOCUMENTS

| | | | |
|---|---|---|---|
| 4,975,695 A | | 12/1990 | Almond et al. |
| 5,386,413 A | | 1/1995 | McAuley et al. |
| 5,398,245 A | | 3/1995 | Harriman, Jr. |
| 5,408,469 A | * | 4/1995 | Opher et al. ............. 370/399 |
| 5,436,893 A | | 7/1995 | Barnett |
| 5,490,252 A | | 2/1996 | Macera et al. |
| 5,600,795 A | * | 2/1997 | Du .......................... 709/227 |
| 5,790,554 A | | 8/1998 | Pitcher et al. |
| 5,852,606 A | | 12/1998 | Prince et al. |

OTHER PUBLICATIONS

Robert J. Souza, et al., GIGAswitch System: A High-performance Packet-switching Platform, Digital Technical Journal, vol. 6, No. 1, Winter 1994.
Edoardo Biagioni, et al., Designing a Practical ATM LAN, IEEE Netowrk, Mar. 1993.
Anthny J. McAule, et al., Fast Routing Table Lookup Using CAMs, IEEE Infocom '93, Proceedings vol. 3, 1993.

* cited by examiner

*Primary Examiner*—Ovidio Escalante

(57) ABSTRACT

A method and apparatus for controlling data flow within a switching device are provided. The switching device includes a cell-switched backplane. Both packet switched and cell switched network interface cards may be coupled to the cell-switched backplane. A destination tag is created for each unique destination port and for each unique set of destination ports. The destination tags are used to index a master destination tag table. The entry of the master destination tag table that corresponds to a given destination tag includes a destination mask that indicates which ports are destination ports the given destination tag. Local tables are built and maintained within each network interface card based on the information contained in the master destination tag table. When a network interface receives data from an external device, the network interface determines the destination tag associated with the data. Once the destination tag is determined, it is used as an index to the locally stored tables to determine whether the data should be forwarded to any local ports, and whether the data should be sent over the cell-switched backplane to other network interfaces within the switching device. When a network interface receives data over the backplane, the network interface uses the destination tag as an index to a locally stored table to determine to which local ports the data should be sent. Tables also establish correlations between destination tags and control information for converting data between packets and cells.

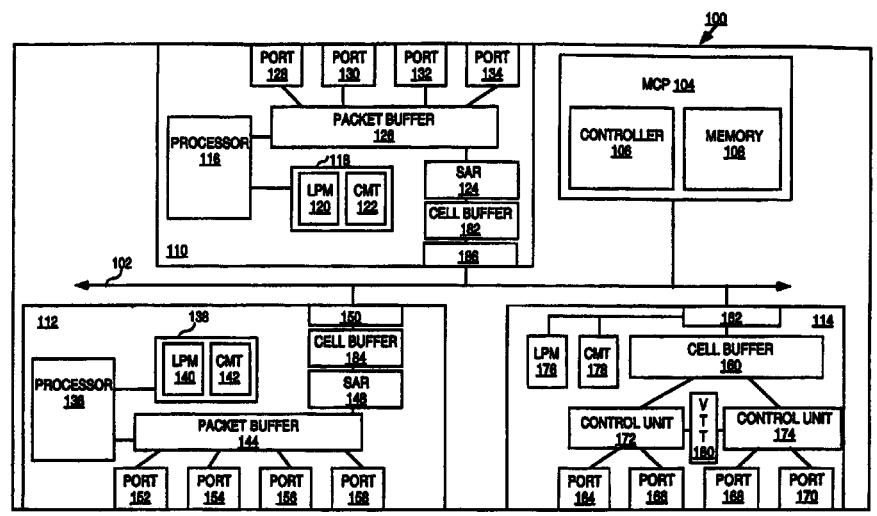

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–4 and 9 is confirmed.

Claims 31–33 are cancelled.

Claims 5–7, 10, 12, 22 and 28 are determined to be patentable as amended.

Claims 8, 11, 13–21, 23–27, 29 and 30, dependent on an amended claim, are determined to be patentable.

New claims 34 and 35 are added and determined to be patentable.

5. [The] *A* method [of claim 1 wherein said] *for forwarding data between ports on a plurality of network interfaces located in a switching device, the method comprising the steps of:*
   receiving data at a first port on a first network interface in said switching device;
   determining a destination tag for said data based on destination information contained with said data;
   using said destination tag as an index to a [said] first table [and] *stored on said first network interface* to determine whether any ports on said first network interface other than said first port are associated with said destination tag;
   if one or more ports on said first network interface other than said first port are associated with said destination tag, then forwarding said data to said one or more ports;
   using said destination tag as an index to a [said] second table [are] stored on said first network interface *to determine whether any of said plurality of network interfaces other than said first network interface include ports that are associated with said destination tag; and*
   if one or more network interfaces other than said first network interface include ports that are associated with said destination tag, then forwarding said data to said one or more network interfaces over a common backplane.

6. The method of claim [5] *1* wherein said first table is a different table than said second table.

7. [The] *A* method [of claim 1 further] *for forwarding data between ports on a plurality of network interfaces located in a switching device, the method* comprising the step of:
   constructing [said] *a* first table and [said] *a* second table based on information contained in a master destination tag table;
   *receiving data at a first port on a first network interface in said switching device;*
   *determining a destination tag for said data based on destination information contained with said data;*
   *using said destination tag as an index to said first table to determine whether any ports on said first network interface other than said first port are associated with said destination tag;*
   *if one or more ports on said first network interface other than said first port are associated with said destination tag, then forwarding said data to said one or more ports;*
   *using said destination tag as an index to said second table to determine whether any of said plurality of network interfaces other than said first network interface include ports that are associated with said destination tag; and*
   *if one or more network interfaces other than said first network interface include ports that are associated with said destination tag, then forwarding said data to said one or more network interfaces over a common backplane.*

10. A switching device comprising:
   a backplane; and
   a plurality of network interfaces coupled to said backplane[;]*,* each of said plurality of network interfaces comprising
      one or more ports;
      a first set of correlation data that establish a correlation between destination information and destination tags, *each destination tag being an index number to control forwarding of data to (i) a single port of said plurality of network interfaces when said destination tag is used for unicast forwarding of said data and (ii) multiple ports of said plurality of network interfaces when said destination tag is used for multicast forwarding of said data*;
      a second set of correlation data that establish a correlation between destination tags and said one or more ports on said network interface;
      a third set of correlation data [that] *differing from the destination tag, the third set of correlation data to* establish a correlation between destination tags and the other of said plurality of network interfaces; and
      a forwarding mechanism configured to forward data between and among said one or more ports and said backplane based on said first, second and third sets of correlation data.

12. The switching device of claim 10 wherein said forwarding mechanism is configured to forward data received over said backplane from another of said network interfaces by:
   determining a destination tag for said data;
   inspecting said second set of correlation data to determine whether any of said one or more ports are associated with said destination tag; and
   forwarding said data to [each] *a first port of* said one or more ports associated with said destination tag *during unicast forwarding and to a plurality of ports of said one or more ports that are associated with said destination tag during multicast forwarding*.

22. A method for forwarding data between ports on a plurality of network interfaces located in a switching device, the method comprising the steps of:
   when data arrives at any port of any of said plurality of network interfaces performing the steps of
      determining a destination tag for said data based on destination information contained with said data by using the destination information as an index into a first table to retrieve a corresponding destination tag if the destination information represents a first type of destination designation scheme, and using the destination information as an index into a second table *differing from the first table,* to retrieve a corresponding destination tag if the destination information represents a second type of destination designation scheme;

using said destination tag as an index to correlation data to determine a set of destination ports associated with said destination tag; and forwarding said data to each destination port in said set of destination ports.

28. A switching device comprising:

a backplane; and a plurality of network interfaces coupled to said backplan;

each of said plurality of network interfaces comprising one or more ports, a first set of correlation data that maps destination addresses to destination tags, *each destination tag being an index number capable of controlling a transfer of data to (i) a single port of said plurality of network interfaces when said destination tag supporting point-to-point forwarding of said data and (ii) two or more ports of said plurality of network interfaces when said destination tag supporting multicast forwarding of said data,* a second set of correlation data that maps destination tags from said first set of correlation data to said one or more ports on said network interface, and a forwarding mechanism configured to forward data among said one or more ports based on said first set of correlation data and said second set of correlation data.

34. The swithcing device of claim 10, *wherein said destination tag comprises a plurality of bits, said plurality of bits being a first value when said destination tag is used for unicast forwarding of said data and a second value when said destination tag is used for multicast forwarding of said data.*

35. The switching device of claim 28, *wherein said destination tag comprises a plurality of bits, said plurality of bits being a first value when said destination tag supporting unicast forwarding of said data and a second value when said destination tag supporting multicast forwarding of said data.*

\* \* \* \* \*